United States Patent
Kim et al.

(10) Patent No.: US 9,729,892 B2
(45) Date of Patent: *Aug. 8, 2017

(54) IMAGE ENCODING AND DECODING APPARATUS AND METHOD

(71) Applicant: SAMSUNG ELECTRONICS CO., LTD., Suwon-si, Gyeonggi-do (KR)

(72) Inventors: Hyun Mun Kim, Seongnam-si (KR); Dae-sung Cho, Seoul (KR); Woo-shik Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

This patent is subject to a terminal disclaimer.

(21) Appl. No.: 14/674,804

(22) Filed: Mar. 31, 2015

(65) Prior Publication Data

US 2015/0208073 A1 Jul. 23, 2015

Related U.S. Application Data

(63) Continuation of application No. 10/893,253, filed on Jul. 19, 2004, now Pat. No. 9,042,442.

(30) Foreign Application Priority Data

Jul. 18, 2003 (KR) ..................... 10-2003-0049129
Jul. 13, 2004 (KR) ..................... 10-2004-0054472

(51) Int. Cl.
*H04N 7/12* (2006.01)
*H04N 11/02* (2006.01)
(Continued)

(52) U.S. Cl.
CPC ........... *H04N 19/44* (2014.11); *H04N 19/105* (2014.11); *H04N 19/107* (2014.11);
(Continued)

(58) Field of Classification Search
CPC ....................................................... H04N 7/50
See application file for complete search history.

(56) References Cited

U.S. PATENT DOCUMENTS

| 4,771,439 A | 9/1988 | Okazaki et al. |
| 5,576,767 A | 11/1996 | Lee et al. |

(Continued)

FOREIGN PATENT DOCUMENTS

| JP | 03/247091 | 11/1991 |
| JP | 9-163376 | 6/1997 |

(Continued)

OTHER PUBLICATIONS

Japanese Office Action issued Sep. 1, 2015 in corresponding Japanese Patent Application 2014-206481.

(Continued)

*Primary Examiner* — Chikaodili E Anyikire
(74) *Attorney, Agent, or Firm* — Staas & Halsey LLP

(57) ABSTRACT

An image encoding and decoding apparatus and method, the image encoding and decoding apparatus includes: an encoding unit adjusting at least one weight value adaptively to the number of bits expressing each pixel of a current image, predicting a pixel value of a block of interest by performing an operation on a pixel value of at least one block having a pixel value similar to the pixel value of the block of interest among blocks included in a previous image and the at least one adjusted weight value, and encoding the pixel value of the block of interest using the predicted pixel value of the block of interest; and a decoding unit adjusting the at least one weight value adaptively to the number of bits, restoring the predicted pixel value of the block of interest by performing an operation on the pixel value of the at least one block having the pixel value similar to the pixel value of the block of interest among blocks included in the restored previous image and the at least one adjusted weight value, (Continued)

and decoding the pixel value of the block of interest using the restored pixel value, wherein the previous image refers to an image displayed prior to a current image, and the block of interest is a target block of interest among blocks belonging to the current image.

1 Claim, 11 Drawing Sheets

(51) Int. Cl.

| | | |
|---|---|---|
| *H04N 11/04* | (2006.01) | |
| *H04N 19/44* | (2014.01) | |
| *H04N 19/105* | (2014.01) | |
| *H04N 19/176* | (2014.01) | |
| *H04N 19/46* | (2014.01) | |
| *H04N 19/61* | (2014.01) | |
| *H04N 19/107* | (2014.01) | |
| *H04N 19/136* | (2014.01) | |
| *H04N 19/142* | (2014.01) | |
| *H04N 19/162* | (2014.01) | |
| *H04N 19/182* | (2014.01) | |
| *H04N 19/50* | (2014.01) | |
| *H04N 19/184* | (2014.01) | |

(52) U.S. Cl.
CPC ......... *H04N 19/136* (2014.11); *H04N 19/142* (2014.11); *H04N 19/162* (2014.11); *H04N 19/176* (2014.11); *H04N 19/182* (2014.11); *H04N 19/184* (2014.11); *H04N 19/46* (2014.11); *H04N 19/50* (2014.11); *H04N 19/61* (2014.11)

(56) References Cited

U.S. PATENT DOCUMENTS

| | | | |
|---|---|---|---|
| 6,097,757 A * | 8/2000 | Boice .................. | H04N 19/172 375/240 |
| 6,266,370 B1 | 7/2001 | Kamikura et al. | |
| 6,351,491 B1 | 2/2002 | Lee et al. | |
| 6,542,545 B1 | 4/2003 | Vetro et al. | |
| 6,646,578 B1 * | 11/2003 | Au .......................... | H03M 7/42 341/67 |
| 7,995,654 B2 | 8/2011 | Boon et al. | |
| 2001/0020906 A1 | 9/2001 | Andrews et al. | |
| 2001/0028746 A1 * | 10/2001 | Kennedy .............. | H04N 19/593 382/238 |
| 2002/0150164 A1 | 10/2002 | Felts et al. | |
| 2003/0215014 A1 * | 11/2003 | Koto .................... | H04N 19/105 375/240.16 |
| 2004/0062448 A1 | 4/2004 | Zeng et al. | |
| 2004/0101059 A1 | 5/2004 | Joch et al. | |
| 2004/0179620 A1 | 9/2004 | Foo et al. | |
| 2004/0258162 A1 | 12/2004 | Gordon et al. | |
| 2005/0276323 A1 | 12/2005 | Martemyanov et al. | |
| 2015/0229936 A1 | 8/2015 | Kim et al. | |

FOREIGN PATENT DOCUMENTS

| | | |
|---|---|---|
| JP | 10/136385 | 5/1998 |
| JP | 10-248072 | 9/1998 |
| JP | 2002-359852 | 12/2002 |
| JP | 2014-195262 | 10/2014 |
| JP | 2015-201892 | 11/2015 |
| KR | 1998-034880 | 8/1998 |
| KR | 1998-0389893 | 6/2003 |
| WO | WO 01/77871 | 10/2001 |

OTHER PUBLICATIONS

Japanese Office Action dated Sep. 27, 2016 in Japanese Patent Application No. 2015-154313.

Japanese Office Action dated Sep. 6, 2016 in Japanese Patent Application No. 2015-135388.
Japanese Office Action issued Mar. 3, 2015 in corresponding Japanese Patent Application 2014-093165.
U.S. Notice of Allowance dated Apr. 8, 2015 from U.S. Appl. No. 14/537,427.
Japanese Office Action issued on Jan. 28, 2014 in Japanese Patent Office in corresponding Japanese Application No. 2012-277248.
Chinese Office Action dated Jul. 31, 2009, issued in corresponding Chinese Patent Application No. 200410089938.1.
Kim Woo-Shik et al., Proposal for Unsolved Issues in Professional Extensions, ITU Study Group 16—Video Coding Experts Group—ISO/IEC MPEG & ITU-T VCEG (ISO/IEC JTC1/SC29/WG11 and ITU-T SG16 Q6), PEXT AD HOC Group Meeting, Trondheim, Norway, Jul. 22-24, 2003, No. JVT-1012r2, Jul. 22, 2003 (Jul. 22, 2003), pp. 1-11.
Kim Woo-Shik et al., Proposal for Unsolved Issues in Professional Extensions II, ITU Study Group 16—Video Coding Experts Group—ISO/IEC MPEG & ITU-T VCEG (ISO/IEC JTC1/SC29/WG11 and ITU-T SG16 Q6), PEXT AD HOC Group Meeting, Trondheim, Norway, Jul. 22-24, 2003, No. JVT-1012r3, Jul. 22, 2003 (Jul. 22, 2003), pp. 1-8, XP030005749.
Wiegand T.; Sullivan G.; "Draft ITU-T Recommendation and Final Draft International Standard of Joint Video Specification (ITU-T Rec. H. 264 ISO/IEC 14496-10 AVC)", ITU Study Group 16—Video Coding Experts Group—ISO/IEC MPEG & ITU-T VCEG(ISO/IEC JTC1/SC29/WG11 and ITU-T SG16 Q6), $7^{th}$ Meeting , Pattaya, Thailand, Mar. 7-14, 2003, No. JVT-g050, Mar. 14, 2003 (Mar. 14, 2003), pp. 1, 95-133.
McMahon T. et a.: "Ad Hoc Group Report on H.264/AVC Professional Extensions", ITU Study Group 16—Video Coding Experts Group—ISO/IEC MPEG & ITU-T VCEG (ISO/IEC JTC1/SC29/WG11 and ITU-T SG16 Q6), $9^{th}$ Meeting, Sep. 2-5, 2003, San Diego, CA, USA, No. JVT-1005, Sep. 2, 2003 (Sep. 2, 2003), pp. 1-12.
Malvar H. et al.: Transform, Scaling & Color Space Impact of Professional Extensions, ITU Study Group 16—Video Coding Experts Group—ISO/IEC MPEG & ITU-T VCEG (ISO/IEC JTC1/SC29/WG11 and ITU-T SG16 Q6), 8th meeting, Geneva, Switzerland, May 23-27, 2003, No. JVT-H031r2, May 27, 2003 (May 27, 2003), pp. 1-7, XP030005735.
"Chapter 8: Applications and Directions" In: Richardson, I. E.G.: H.264 and MPEG-4 Video Compression: Video Coding for Next-Generation Multimedia:, Oct. 17, 2003 (Oct. 17, 2003), John Wiley & Sons, XP030001628, pp. 269-276.
Wiegand T.; Sullivan G.; "Draft ITU-T Recommendation and Final Draft International Standard of Joint Video Specification (ITU-T Rec. H. 264 ISO/IEC 14496-10 AVC)", ITU Study Group 16—Video Coding Experts Group—ISO/IEC MPEG & ITU-T VCEG(ISO/IEC JTC1/SC29/WG11 and ITU-T SG16 Q6), $7^{th}$ Meeting , Pattaya, Thailand, Mar. 7-14, 2003, No. JVT-g050, Mar. 14, 2003 (Mar. 14, 2003), pp. 1,-250.
"Chapter 8: Applications and Directions" In: Richardson, I. E.G.: H.264 and MPEG-4 Video Compression: Video Coding for Next-Generation Multimedia:, Oct. 17, 2003 (Oct. 17, 2003), John Wiley & Sons, XP030001628, pp. 1-281.
Pattaya, International Organisation for Standardisation: Coding of Moving Pictures and Video "Draft Text of Final Draft International Standard for Advanced Coding", Mar. 2003, ISO/IEC JTC 1/SC 29/WG 11 N5555.
ISO/IEC FDIS 14996-10: Information Technology—Coding of audio visual objects—Part 10: Advanced Video Coding, ISO/IEC JTC 1/SC 29/WG 11, N5555, Mar. 31, 2003.
Korean Office Action dated Feb. 28, 2006 in Korean Application No. 10-2004-0054472.
Second Chinese Office Action dated Jul. 27, 2012 corresponds to Chinese Patent Application No. 201110039380.6.
Japanese Notice of Non-final Rejection mailed Jun. 19, 2011 corresponds to Japanese Application No. 2010-265777.
Chinese Office Action dated Nov. 23, 2011 corresponds to Chinese Patent Application No. 201110039380.6.

(56) References Cited

OTHER PUBLICATIONS

European Summons to Attend Oral Proceedings Pursuant to Rule 115(1) EPC mailed Jul. 12, 2011 in European Patent Application No. 08153435.6-2223/1959689.
Extended European Search Report mailed Jul. 11, 2011 in European Patent Application No. 10186126.8-2223/2323395.
Extended European Search Report mailed Jul. 11, 2011 in European Patent Application No. 10186131.8-2223/2323396.
Extended European Search Report mailed Jul. 11, 2011 in European Patent Application No. 10186139.1-2223/2323397.
Extended European Search Report mailed Jul. 11, 2011 in European Patent Application No. 10186145.8-2223/2323400.
Extended European Search Report mailed Jul. 11, 2011 in European Patent Application No. 10186150.8-2223/2323401.
"Information Technology—Coding of Audio-Visual Abjects: Visual ISO/IEC 14496-2" International Organisation for Standardization—Organisation Internationale De Normalisation, No. N2202, Mar. 1998 (Mar. 1998), pp. 1-329 XP00861689 p. XI paragraph 1.4.4.6.; pp. 226-228, paragraphs 9,9.1,9.2.
Wiegand T., "Draft ITU-T Recommendation and Final Draft International Standard of Joint Video Specification (ITU-T Rec. H.264/ISO/IEC 14496-10 AVC)", Joint Video Team (JVT) of ISO/IEC MPEG & ITU-VCEG (ISO/IEC JTC1/SC29/WG11 and ITU-T SG16 Q6), Apr. 2, 2003, page complete XP002328607, p. 64-p. 66, paragraph 7.4.3.3, p. 113-p. 115, paragraph 8.4.1.2.3.
European Search Report issued Mar. 26, 2010 corresponds to European Application No. 08 15 3435.
Japanese Notice of Non-final Rejection mailed Jun. 30, 2010 corresponds to Japanese Application No. 2004-211658.
U.S. Office Action mailed Mar. 28, 2008 in U.S. Appl. No. 10/893,253.
U.S. Office Action mailed Oct. 14, 2008 in U.S. Appl. No. 10/893,253.
U.S. Advisory Action mailed Feb. 25, 2009 in U.S. Appl. No. 10/893,253.
U.S. Office Action mailed May 27, 2009 in U.S. Appl. No. 10/893,253.
U.S. Office Action mailed Dec. 11, 2009 in U.S. Appl. No. 10/893,253.
U.S. Office Action mailed May 14, 2010 in U.S. Appl. No. 10/893,253.
U.S. Advisory Action mailed Nov. 9, 2010 in U.S. Appl. No. 10/893,253.
U.S. Office Action mailed Feb. 18, 2011 in U.S. Appl. No. 10/893,253.
U.S. Office Action mailed Aug. 31, 2011 in U.S. Appl. No. 10/893,253.
U.S. Office Advisory Action mailed Dec. 19, 2011 in U.S. Appl. No. 10/893,253.
U.S. Office Action mailed Feb. 21, 2012 in U.S. Appl. No. 10/893,253.
U.S. Office Action mailed Oct. 1, 2012 in U.S. Appl. No. 10/893,253.
U.S. Office Action mailed May 3, 2013 in U.S. Appl. No. 10/893,253.
U.S. Notice of Allowance mailed Jun. 27, 2014 in U.S. Appl. No. 10/893,253.
U.S. Final Office Action mailed Dec. 23, 2013 in U.S. Appl. No. 10/893,253.
U.S. Notice of Allowance mailed Jun. 8, 2012 in U.S. Appl. No. 13/067,450.
U.S. Office Action mailed Nov. 17, 2014 in U.S. Appl. No. 10/893,253.
U.S. Notice of Allowance mailed Jun. 22, 2012 in U.S. Appl. No. 13/067,451.
U.S. Office Action mailed Jan. 23, 2015 in U.S. Appl. No. 14/537,427.
U.S. Notice of Allowance mailed Mar. 10, 2015 in U.S. Appl. No. 10/893,253.
U.S. Appl. No. 10/893,253, filed Jul. 19, 2004, Hyun Mun Kim et al., Samsung Electronics Co., Ltd.
U.S. Appl. No. 13/067,450, filed Jun. 1, 2011, Hyun Mun Kim et al., Samsung Electronics Co., Ltd.
U.S. Appl. No. 13/067,451, filed Jun. 1, 2011, Hyun Mun Kim et al., Samsung Electronics Co., Ltd.
U.S. Appl. No. 14/537,427, filed Nov. 10, 2014, Hyun Mun Kim et al., Samsung Electronics Co., Ltd.
U.S. Appl. No. 14/666,951, filed Mar. 24, 2015, Hyun Mun Kim et al., Samsung Electronics Co., Ltd.
U.S. Appl. No. 14/671,648, filed Mar. 27, 2015, Hyun Mun Kim et al., Samsung Electronics Co., Ltd.
US Office Action dated Dec. 9, 2016 in U.S. Appl. No. 14/666,951.
US Office Action dated Dec. 16, 2016 in U.S. Appl. No. 14/671,648.
U.S. Office Action dated Jan. 13, 2017 in U.S. Appl. No. 14/666,951.
U.S. Office Action dated Jan. 13, 2017 in U.S. Appl. No. 14/671,648.
U.S. Notice of Allowance dated Mar. 10, 2017 in U.S. Appl. No. 14/666,951.
U.S. Notice of Allowance dated Mar. 8, 2017 in U.S. Appl. No. 14/671,648.
U.S. Appl. No. 15/609,595, filed May 31, 2017 Hyun Mun Kim et al., Samsung Electronics Co., Ltd.

* cited by examiner

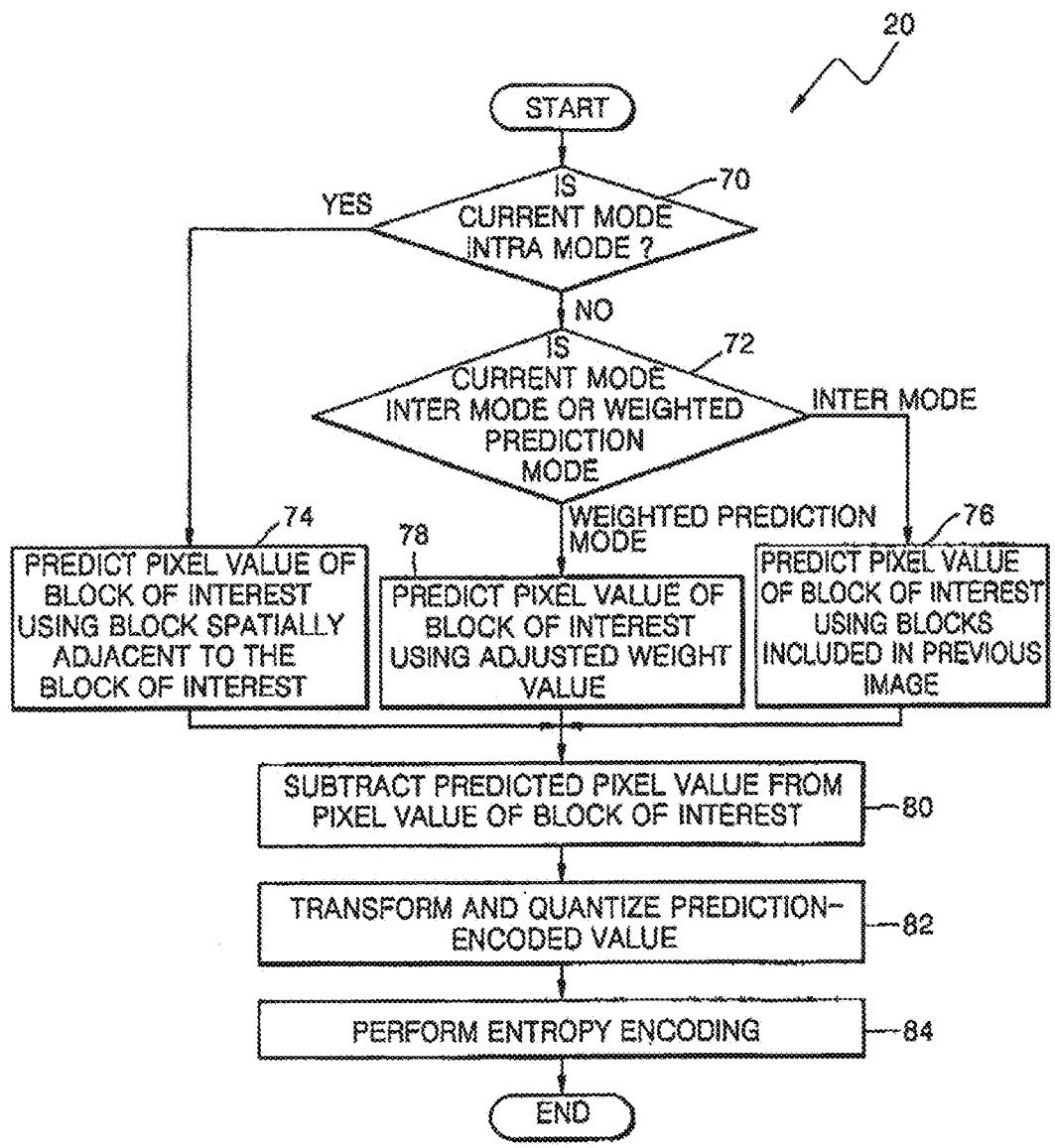

IMAGE ENCODING AND DECODING APPARATUS AND METHOD

CROSS-REFERENCE TO RELATED APPLICATIONS

This application is a continuation of U.S. patent application Ser. No. 10/893,253, filed on Jul. 19, 2004, in the U.S. Patent and Trademark Office, which claims the priority of Korean Patent Application No. 10-2004-0054472, filed on Jul. 13, 2004, in the Korean Intellectual Property Office and Korean Patent Application No. 10-2003-0049129, filed Jul. 18, 2003, in the Korean Intellectual Property Office, the disclosures of each of which are incorporated herein by reference.

BACKGROUND OF THE INVENTION

1. Field of the Invention

The present invention relates to image processing, and more particularly, to an apparatus and method of encoding and decoding images.

2. Description of the Related Art

A conventional image encoding and decoding apparatus utilizes time-prediction encoding and decoding when encoding temporally successive images so as to remove redundant information between a previous image and a current image. In the time-prediction encoding and decoding method, the current image is subtracted from the previous image, and the subtracted result is encoded and decoded. According to H.264/MPEG-4 Part 10 AVC standardization suggested by the Joint Video Team (JVT) of ISO/IEC MPEG and ITU-T VCEG, there are various conventional time-prediction encoding and decoding methods ("Text of ISO/IEC FDIS 14496-10: Information Technology—Coding of audio-visual objects—Part 10: Advanced Video Coding", ISO/IEC JTC 1/SC 29/WG 11, N5555, March, 2003). One of these methods is a weighted prediction encoding method in which prediction encoding is performed on a current image using the result of multiplying or adding a pixel value of a previous image by or to a constant value. This method provides excellent compression efficiency when applied to a region where images gradually become dark or bright or to a region in which two scenes overlap when one scene is replaced by another scene.

FIGS. 1A and 1B illustrate exemplary scene changing, in which FIG. 1A illustrates an example of scene changing occurring while two different scenes overlap, and FIG. 1B illustrates another example of scene changing using fade-out and fade-in.

Compression efficiency can be greatly increased using the weighted prediction encoding method when a scene changing, as illustrated FIGS. 1A and 1B, occurs. In the case of FIG. 1A, an intermediate image between a previous scene and a following scene can be weighted prediction-encoded by applying proper weight values to the previous and following scenes. In the case of FIG. 1B, a fading-out effect can be obtained by applying a proper weight value to the previous scene, and a fading-in effect can be obtained by applying a proper weight value to the following scene.

However, in the conventional method, the number of bits expressing a single pixel of an image is fixed at 8. Therefore, it is practically difficult to use the conventional method in the current circumstance where the need for high quality images continues to increase.

SUMMARY OF THE INVENTION

According to an aspect of the present invention, there is provided an image encoding and decoding apparatus using a weight value that is adapted to the number of bits expressing each pixel of an image.

According to an aspect of the present invention, there is provided an image encoding and decoding method using a weight value that is adapted to the number of bits expressing each pixel of an image.

According to an aspect of the present invention, there is provided an image encoding and decoding apparatus including: an encoding unit adjusting at least one weight value adaptively to a number of bits expressing each pixel of a current image, predicting a pixel value of a block of interest by performing an operation on the pixel value of at least one block having the pixel value similar to the pixel value of the block of interest among blocks included in a previous image and the at least one adjusted weight value, and encoding the pixel value of the block of interest using the predicted pixel value of the block of interest; and a decoding unit adjusting at least one weight value adaptively to the number of bits, restoring the predicted pixel value of the block of interest by performing an operation on the pixel value of at least one block having pixel value similar to the pixel value of the block of interest among blocks included in the restored previous image and the at least one adjusted weight value, and decoding the pixel value of the block of interest using the restored pixel value, wherein the previous image refers to an image displayed prior to the current image, and the block of interest is a target block of interest among blocks belonging to the current image.

According to another aspect of the present invention, there is provided an image encoding and decoding method including: adjusting at least one weight value adaptively to the number of bits expressing each pixel of a current image, predicting a pixel value of a block of interest by performing an operation on a pixel value of at least one block having pixel value similar to the pixel value of the block of interest among blocks included in a previous image and the at least one adjusted weight value, and encoding the pixel value of the block of interest using the prediction value of the block of interest; and adjusting at least one weight value adaptively to the number of bits, restoring the prediction value of the block of interest by performing an operation on the pixel value of at least one block having pixel value similar to the pixel value of the block of interest among blocks included in the restored previous image and the at least one adjusted weight value, and decoding the pixel value of the block of interest using the restored pixel value, wherein the previous image refers to an image displayed prior to the current image, and the block of interest is a target block of interest among blocks belonging to the current image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a flowchart illustrating operation 20 of FIG. 3 according to an embodiment of the present invention;

DETAILED DESCRIPTION OF THE EMBODIMENTS

Figure 1A:
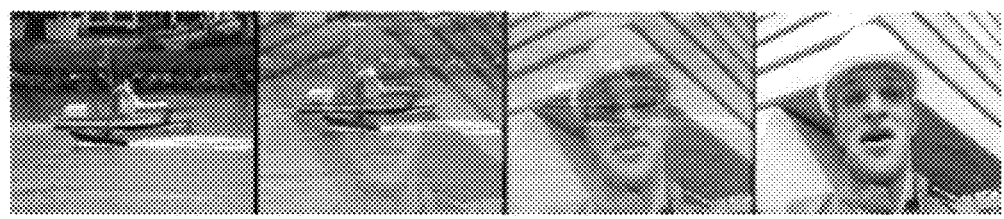
FIGS. 1A and 1B illustrate examples of a scene changing.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
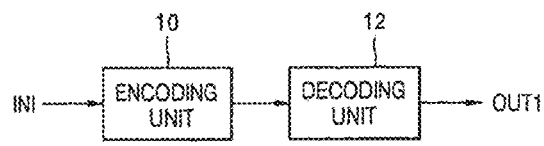
FIG. 2 is a block diagram of an image encoding and decoding apparatus according to an embodiment of the present invention.

FIG. 2 is a block diagram of an image encoding and decoding apparatus according to an embodiment of the present invention. The image encoding and decoding apparatus includes an encoding unit 10 and a decoding unit 12.

Figure 3:
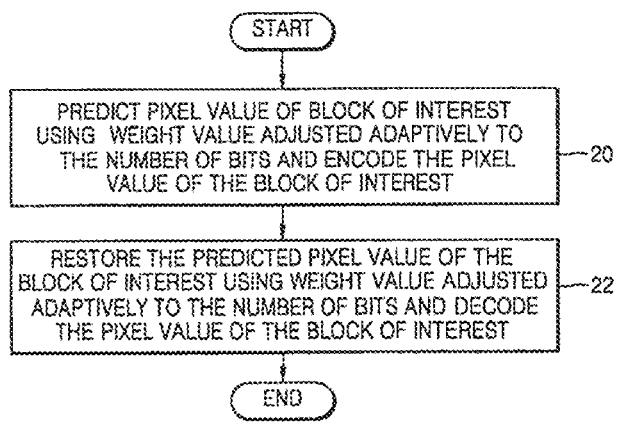
FIG. 3 is a flowchart illustrating an image encoding and decoding method according to an embodiment of the present invention.

FIG. 3 is a flowchart illustrating an image encoding and decoding method according to the present invention. The image encoding and decoding method includes encoding and decoding a pixel value of a block of interest using a weight value adjusted adaptively to the number of bits (operations 20 and 22).

The encoding unit 10 in FIG. 2 adjusts at least one weight value adaptively to the number of bits expressing each pixel of an image, finds a block having a similar pixel value (hereinafter, "similar previous block") to a block of interest among blocks included in a previous image (hereinafter, "previous blocks"), predicting the pixel value of the block of interest by performing an operation on the at least one adjusted weight value and the pixel value of the found block, and encoding the pixel value of the block of interest using the predicted pixel value corresponding to a result of the operation (operation 20). Here, a plurality of similar previous blocks may exist. A previous image refers to an image displayed prior to a current image. The block of interest refers to a target block of interest, i.e., a block to be currently encoded, in the current image input via an input port IN1. A pixel value may refer to a R (Red), G (Green), and B (Blue) value expressing the pixel, or a luminance signal (Y) and a color difference signal (CbCr).

A plurality of pixels may exist in the block of interest. In this case, pixels having similar pixel values to the pixel value of each of the pixels included in the block of interest are found throughout the similar previous block.

Figure 4A:
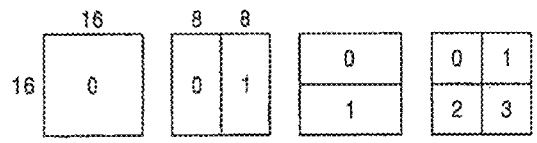
FIGS. 4A and 4B illustrate exemplary divisions of an image.
Figure 4B:
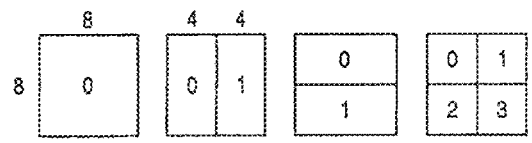

FIGS. 4A and 4B illustrate exemplary divisions of an image, in which FIG. 4A illustrates various divided macroblocks, and FIG. 4B illustrates further divisions of a divided macroblock in FIG. 4A.

Referring to FIG. 4A, a macroblock having 16×16 pixels is divided into various sizes having 16×8, 8×16, and 8×8 pixels to obtain motion vectors. Referring to FIG. 4B, the macroblock having 8×8 pixels is further divided to have 8×4, 4×8, and 4×4 pixels.

As described above, the image encoding and decoding apparatus according to the present invention divides a current image and a previous image into blocks having a predetermined size, as illustrated in FIG. 4A or 4B, and processes the image in units of divided blocks.

Figure 5:
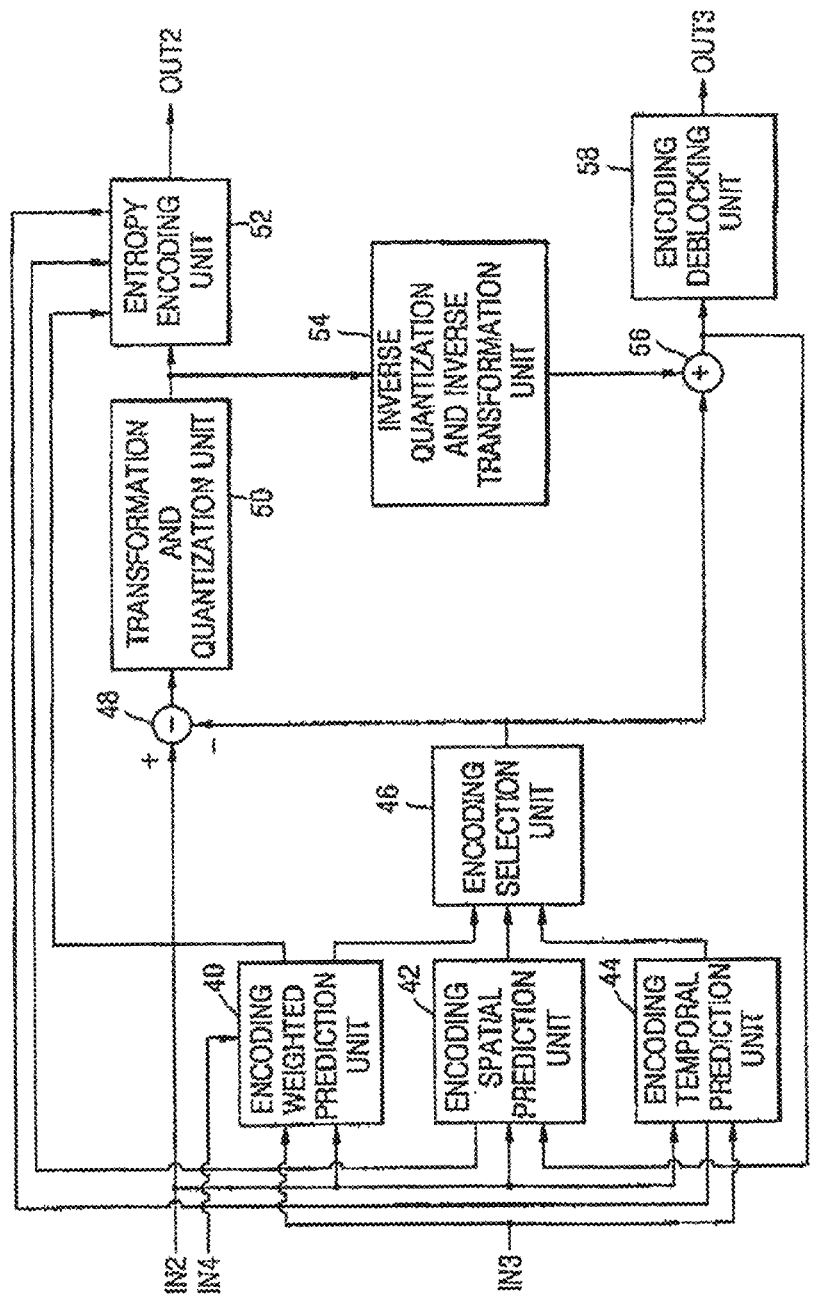
FIG. 5 is a block diagram of an embodiment of an encoding unit of FIG. 1 according to the present invention.

FIG. 5 is a block diagram of an embodiment of the encoding unit 10 of FIG. 2 according to the present invention. The encoding unit 10 of FIG. 5 includes an encoding weighted prediction unit 40, an encoding spatial prediction unit 42, an encoding temporal prediction unit 44, an encoding selection unit 46, a subtraction unit 48, a transformation and quantization unit 50, an entropy encoding unit 52, an inverse quantization and inverse transformation unit 54, and an encoding addition unit 56, and an encoding deblocking unit 58.

FIG. 6 is a flowchart illustrating operation 20 in FIG. 3 according to the present invention. Operation 20 includes predicting a pixel value according to each mode (Operations 70 through 78), obtaining a prediction-encoded value (operation 80), and performing transformation, quantization, and entropy encoding (operations 82 and 84).

The encoding selection unit 46 in FIG. 5 selects as a prediction value one of predicted pixel values, which are predicted in the encoding weighted prediction unit 40, the encoding spatial prediction unit 42, and the encoding temporal prediction unit 44, and outputs the selected prediction value to the subtraction unit 48 and to the encoding addition unit 56 (operations 70 and 72).

For example, the encoding selection unit 46 determines whether a current mode is an intra mode (operation 70). If the current mode is determined not to be the intra mode, the encoding selection unit 46 determines whether the current mode is an inter mode or a weighted prediction mode (operation 72).

If the current mode is determined to be the intra mode, the encoding selection unit 46 selects an output from the encoding spatial prediction unit 42. The encoding spatial prediction unit 42 predicts a pixel value of the block of interest using the block of interest input via the input port IN2 and an adjacent block input from the encoding addition unit 56 and outputs the predicted pixel value to the encoding selection unit 46 (operation 74). Here, the adjacent block refers to a block spatially adjacent to the block of interest among blocks included in the current image.

Figure 7A:
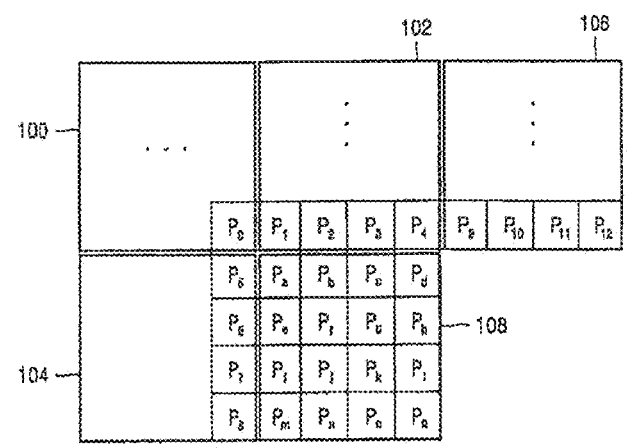
FIGS. 7A and 7B illustrates a block of interest and adjacent blocks and spatial prediction definition.
Figure 7B:
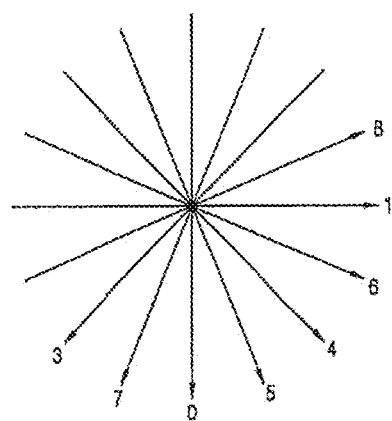

FIGS. 7A and 7B are for the convenience of understanding the encoding spatial prediction unit 42 in FIG. 5. FIG. 7A illustrates a block of interest 108 and adjacent blocks 100 through 106. FIG. 7B is for explaining spatial prediction direction.

The block of interest 108 in FIG. 7A includes pixels $P_a$ through $P_q$. The adjacent block 100 includes at least a pixel $P_0$ adjacent to the block of interest 108, the adjacent block 102 includes at least pixels $P_1$, $P_2$, $P_3$ and $P_4$ adjacent to the block of interest 108, the adjacent block 104 includes at least pixels $P_5$, $P_6$, $P_7$, and $P_8$ adjacent to the block of interest 108, and the adjacent block 106 includes at least pixels $P_9$, $P_{10}$, $P_{11}$, and $P_{12}$ adjacent to the block of interest 108.

There are 9 directions, from 0 to 8 in FIG. 7B, in which pixels spatially adjacent to the block of interest 108 are projected to predict a pixel value of each of the pixels included in the block of interest 108. Here, number 2 having no direction is not shown in FIG. 7B. For example, in the case of direction 0, pixels $P_1$, $P_2$, $P_3$, and $P_4$ are vertically projected to predict the pixel value of each of the pixels included in the block of interest 108. That is, predicted pixel values of pixels $P_a$, $P_e$, $P_i$, and $P_m$ correspond to the pixel value of pixel $P_1$, predicted pixel values of pixels $P_b$, $P_f$, $P_j$, and $P_n$ correspond to the pixel value of pixel $P_2$, predicted pixel values of pixels $P_c$, $P_g$, $P_k$, and $P_o$ correspond to the pixel value of pixel $P_3$, predicted pixel values of pixels $P_d$, $P_h$, $P_l$, and $P_o$ correspond to the pixel value of pixel $P_4$. In all the other directions, projection is performed in the same manner to predict the pixel value of each of the pixels included in the block of interest 108. The encoding spatial prediction unit 42 outputs to the entropy encoding unit 52 various kinds of additional information used when predicting the pixel value of the block of interest 108, for example, projection direction, i.e., prediction direction.

When the current mode is determined to be the inter mode, the encoding selection unit 46 selects an output from the encoding temporal prediction unit 44. Here, the encoding temporal prediction unit 44 predicts the pixel value of the block of interest using the block of interest input via the input port IN2 and the previous block input via the input port IN3 and outputs the predicted pixel value of the block of interest to the encoding selection unit 46 (operation 76). For example, the encoding temporal prediction unit 44 estimates motion by comparing the block of interest and the previous block and predicts the pixel value of each of the pixels included in the block of interest using the estimated motion. Here, various kinds of additional information used when predicting the pixel value in the encoding temporal prediction unit 44, for example, the estimated motion, are output to the entropy-encoding unit 52.

When the current mode is determined to be the weighted prediction mode, the encoding selection unit 46 selects an output from the encoding weighted prediction unit 40. Here, the encoding weighted prediction unit 40 adjusts the weight value adaptively to the number of bits, predicts the pixel value of the block of interest using the adjusted weight value, the block of interest input via the input port IN2 and the previous blocks input via the input port IN3, and outputs the predicted pixel value to the encoding selection unit 46 (operation 78). To this end, the number of bits may be input via an input port IN4.

Here, the previous block input via the input port IN3 to the encoding weighted prediction unit 40 and the encoding temporal prediction unit 44 illustrated in FIG. 5 is a block that belongs to a previous image previously decoded in the encoding deblocking unit 58. Various kinds of additional information used when predicting the pixel value in the encoding weighted prediction unit 40, for example, estimated motion, is output to the entropy-encoding unit 52.

According to the present invention, the encoding weighted prediction unit 40 may adjust the weight value in proportion to the number of bits.

Figure 8:
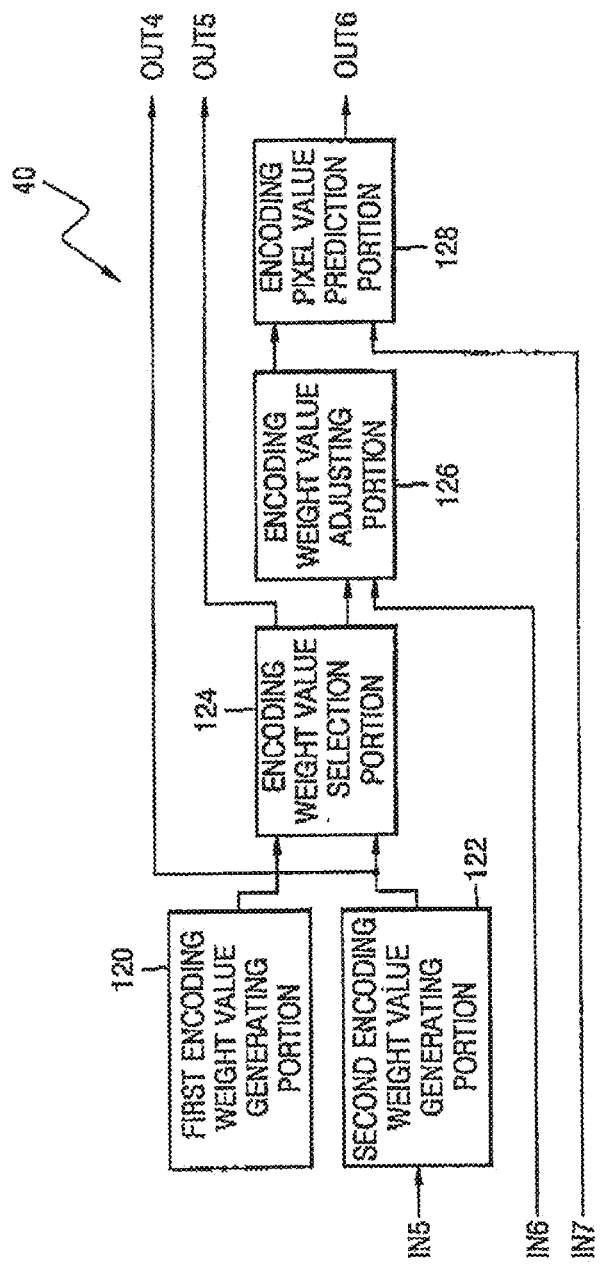
FIG. 8 is a block diagram of an embodiment of an encoding weighted prediction unit shown in FIG. 5.

FIG. 8 is a block diagram of an embodiment of the encoding weighted prediction unit 40 in FIG. 5 according to the present invention. The encoding weighted prediction unit 40 includes first and second encoding weighted value generating units 120 and 122, an encoding weight value selection portion 124, an encoding weight value adjusting portion 126, and an encoding pixel value prediction portion 128.

Figure 9:
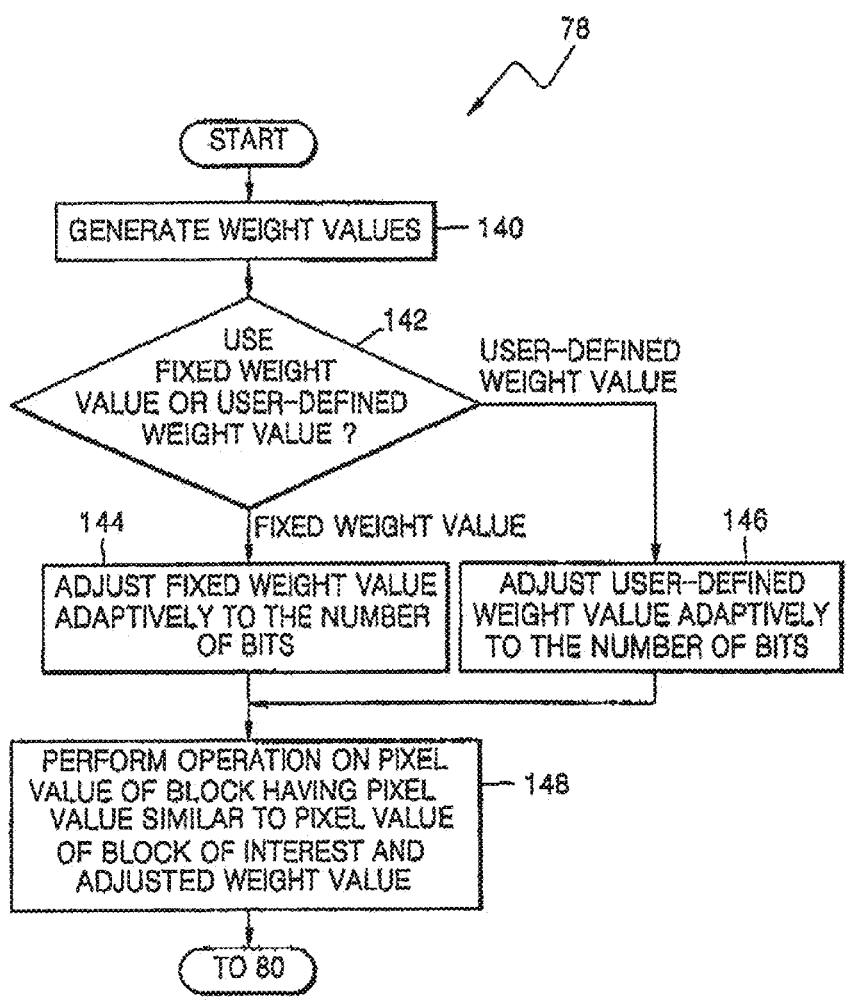
FIG. 9 is a flowchart illustrating operation 78 of FIG. 6 according to an embodiment of the present invention.

FIG. 9 is a flowchart illustrating operation 78 in FIG. 6 according to the present invention. Operation 78 includes generating and adjusting the weight value (operations 140 through 146) and performing an operation on the adjusted weight value and a pixel value of the similar previous block (operation 148).

The first and second encoding weight value generating portions 120 and 122 illustrated in FIG. 8 generate weight values (operation 140). In particular, the first encoding weight value generating portion 120 generates a fixed weight value and outputs the generated fixed weight value to the encoding weight value selection portion 124. At this time, the second encoding weight value generating portion 122 generates a weight value defined by a user (hereinafter, "user-defined weight value") and outputs the generated user-defined weight value to the encoding weight value selection portion 124. To this end, the second encoding weight generating unit 122 may receive the user-defined weight value via an input port IN5. Alternatively, the second encoding weight generating unit 122 may include a manipulation unit (not shown) that is manipulated by the user to generate the weight value. The user-defined weight value, which is generated in the second encoding weight value generating portion 122, is output via an output port OUT4 to the entropy encoding unit 52.

According to the present invention, the second encoding weight generating unit 122 may generate weight values, to be operated on the pixel values of similar previous blocks, differently according to the similar previous blocks.

After operation 140, the encoding weight selection unit 124 selects one of the weight values generated in the first and second encoding weight value generating portions 120 and 122 and outputs the selected weight value to the encoding weight value adjusting portion 126. In particular, the encoding weight value selection portion 124 determines whether to use the fixed weight value generated in the first encoding weight value generating portion 120 or the user-defined weight value generated in the second encoding weight value generating portion 122, selects the fixed weight value or the user-defined weight value in response to the result of the determination, and outputs the selected weight value to the encoding weight value adjusting portion 126 (operation 142). The encoding weight value selection portion 124 outputs the result of the determination via an output port OUT5 to the entropy-encoding unit 52. In particular, if the fixed weight value is determined to be used, the encoding weight value selection portion 124 selects the fixed weight value and outputs the selected fixed weight value to the encoding weight value adjusting portion 126. However, if the user-defined weight value is determined to be used, the encoding weight value selection portion 124 selects the user-defined weight value and outputs the selected user-defined weight value to the encoding weight value adjusting portion 126.

The encoding weight value adjusting portion 126 adjusts the fixed weight value or the user-defined weight value adaptively to the number of bits input via an input port IN6 and outputs the adjusted weight value to the encoding pixel value prediction portion 128 (operation 144 or 146).

According to an embodiment of the present invention, the encoding weight value adjusting portion 126 may adjust the weight value adaptively to the number of bits to represent the pixel value according to equation (1) below.

$$W' = W \cdot 2^{(N-M)} \quad (1)$$

where W is a weight value before the adjustment, W' is a weight value after the adjustment, N is the number of bits, and M is a constant.

In general, images obtained using an image capturing device such as a camera are expressed in a predetermined size, that is, a number of pixels, by sampling. As the number of bits required to express a value of each pixel becomes greater, the range in which the pixel values can be expressed becomes wider and a higher quality image can be expressed. In most cases, the number of bits is 8. The number of bits is increased to 10 or 12 in the field of high quality image display. Considering this, the constant M in equation (1) may be, for example, 8, 10, or 12.

After operation 144 or 146, the encoding pixel value prediction portion 128 performs an operation on a pixel value of at least one similar previous block among the previous blocks input via an input port IN7 and the adjusted weight value, determines the result of the operation as the predicted pixel value of the block of interest, and outputs the result via an output port OUT6 to the encoding selection unit 46 (operation 148).

According to the present invention, the encoding pixel value prediction portion 128 may predict the pixel value of the block of interest by multiplying the pixel values of the similar previous blocks by the adjusted weight values and adding other adjusted weight values to the products. For example, the encoding pixel value prediction portion 128 may predict the pixel value of the block of interest using equation (2) below.

$$E(x, y) = \sum_{i=1}^{r} \frac{W_i' \times p_i(x, y) + O_i'}{r} \quad (2)$$

where E(x,y) represents a predicted pixel value of a pixel located at (x, y) among pixels belonging to the block of interest, $p_i(x,y)$ represents a pixel value of a pixel located at (x,y) among pixels belonging to a similar previous block, $W_i'$ represents a weight value adjusted from a weight value $W_i$, and $O_i'$ is a weight value adjusted from a weight value $O_i$. In particular, $W_i'$ and $O_i$ are weight values selected by the encoding weight value selection portion 124, and $W_i'$ and $O_i'$ are weight values adjusted in the encoding weight value adjusting portion 126.

For example, when i=1 and i=2, the encoding weight value adjusting portion 126 may adjust weight values according to formula (3) or (4) to obtain adjusted weight values $W_1'$, $W_2'$, $O_1'$, and $O_2'$.

$$W_1' = W_1 \cdot 2^{(N-M)}$$

$$W_2' = W_2 \cdot 2^{(N-M)}$$

$$O_1' = O_1 \cdot 2^{(N-M)}$$

$$O_2' = O_2 \cdot 2^{(N-M)}$$

$$W_1' = W_1 \quad (3)$$

$$W_2' = W_2$$

$$O_1' = O_1 \cdot 2^{(N-M)}$$

$$O_2' = O_2 \cdot 2^{(N-M)} \quad (4)$$

According to the present invention, when the similar previous blocks are included in the same previous image, the first encoding weight value generating portion 120 may generate weight values $W_1$ and $W_2$ using equation (5) below.

$$W_1 = W_2, \ O_1 = O_2 \quad (5)$$

where, in the case of H.264, $W_1 = W_2 = 32$ and $O_1 = O_2 = 0$.

However, when the similar previous blocks are distributed in different previous image, the first encoding weight generating unit 120 generates weight values according to a time difference between the time when each of the similar previous images is displayed and the time when the current image is displayed.

The encoding unit 10 of FIG. 5 predicts the pixel value of the block of interest using the encoding weighted prediction unit 40, the encoding spatial prediction unit 42, or the encoding temporal prediction unit 44, thereby increasing the encoding efficiency.

After operation 74, 76, or 78, the subtraction unit 48 subtracts the predicted pixel value input from the encoding selection unit 46 from the pixel value of the block of interest input via the input port IN2 according to equation (6) and outputs the subtracted result to the transformation and quantization unit 50 as a prediction encoded value (operation 80).

$$dn(x,y) = bn(x,y) - E(x,y) \quad (6)$$

where dn(x,y) represents a prediction encoded value for an $n^{th}$ block of interest in the current image and bn(x,y) represents a pixel value of the pixel located at (x,y) among pixels belonging to the $n^{th}$ block of interest in the current image.

After operation 80, the transformation and quantization unit 50 transforms the prediction-encoded value input from the subtraction unit 48, quantizes the transformed result, and outputs the quantized result or quantized value to both the entropy encoding unit 52 and the inverse quantization and inverse transformation unit 54 (operation 82). Here, the transformation may be discrete cosine transformation (DCT), integer transformation of H.264, etc.

After operation 82, the entropy encoding unit 52 performs entropy encoding on the transformed and quantized result output from the transformation and quantization unit 50 and outputs the entropy-encoded result in the form of bitstreams via an output port OUT 2 to the decoding unit 12 (operation 84). For example, amount of errors and/or the number of bits included in the entropy-encoded result output through an output port OUT2 from the entropy encoding unit 52 may differ according to whether the encoding weight selection unit 124 of FIG. 8 selects the fixed weight value or the user-defined weight value. Therefore, after the user perceives the amount of errors and/or the number of bits included in the entropy-encoded result when the fixed weight value is selected in the encoding weight selection unit 124 and perceives the amount of errors and/or the number of bits included in the entropy-encoded result when the user-defined weight value is selected in the encoding weight selection unit 124, the user determines the weight value resulting in making the amount of errors and/or making the number of bits included in the entropy-encoded result to be small, according to the perceived results. Then, the user controls the encoding weight selection unit 124 in order for the encoding weight selection unit 124 to select the determined weight value.

The entropy encoding unit 52 receives additional information from the encoding weighted prediction unit 40, the encoding spatial prediction unit 42, and the encoding temporal prediction unit 44, encodes the received additional information, and outputs the encoded result, which is included in the bitstreams, via the output port OUT2 to the decoding unit 12. The reason why additional information, such as estimated motion, from the encoding weighted prediction unit 40 and the encoding temporal prediction unit 44, is entropy-encoded in the entropy encoding unit 52 to be sent to the decoding unit 12 is for enabling the decoding unit 12 to find the similar previous block, which will be described later.

In operation 84, the inverse quantization and inverse transformation unit 54, the encoding addition unit 56, and the encoding deblocking unit 58 of the encoding unit 10 perform the following operations so as to refer to previous images.

The inverse quantization and inverse transformation unit 54 inverse-quantizes the quantized result input from the transformation and quantization unit 50, inverse-transforms the inverse quantized result, and outputs the inverse-transformed result as the result of restoring the prediction-encoded value, to the encoding addition unit 56. The encoding addition unit 56 performs an addition on the restored prediction-encoded value input from the inverse quantization and inverse transformation unit 54 and the predicted pixel value input from the encoding selection unit 46, and outputs the result of the addition to both the encoding deblocking unit 58 and the encoding spatial prediction unit 42.

The encoding deblocking unit 58 deblocks the result of the addition performed in the encoding addition unit 56 and outputs the deblocked result as the result of decoding the pixel value of the block of interest, via an output port OUT3. The deblocking performed in the encoding deblocking unit 58 is to eliminate a blocking phenomenon that has occurred since the encoding unit 10 of FIG. 3 has processed images in units of blocks.

After operation 20, the decoding unit 12 adjusts at least one weight value adaptively to the number of bits, performs an operation on a pixel value of at least one block having a pixel value similar to a pixel value of the block of interest among the blocks included in a restored previous image and the at least one adjusted weight value to restore a predicted pixel value of the block of interest, and decodes the pixel value of the block of interest using the restored predicted pixel value (operation 22).

Figure 1B:
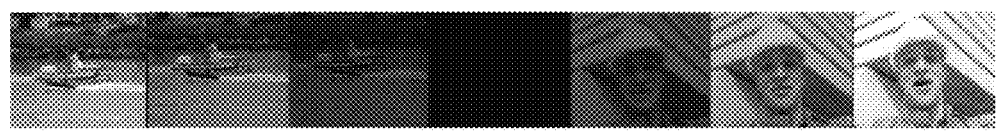
Figure 10:
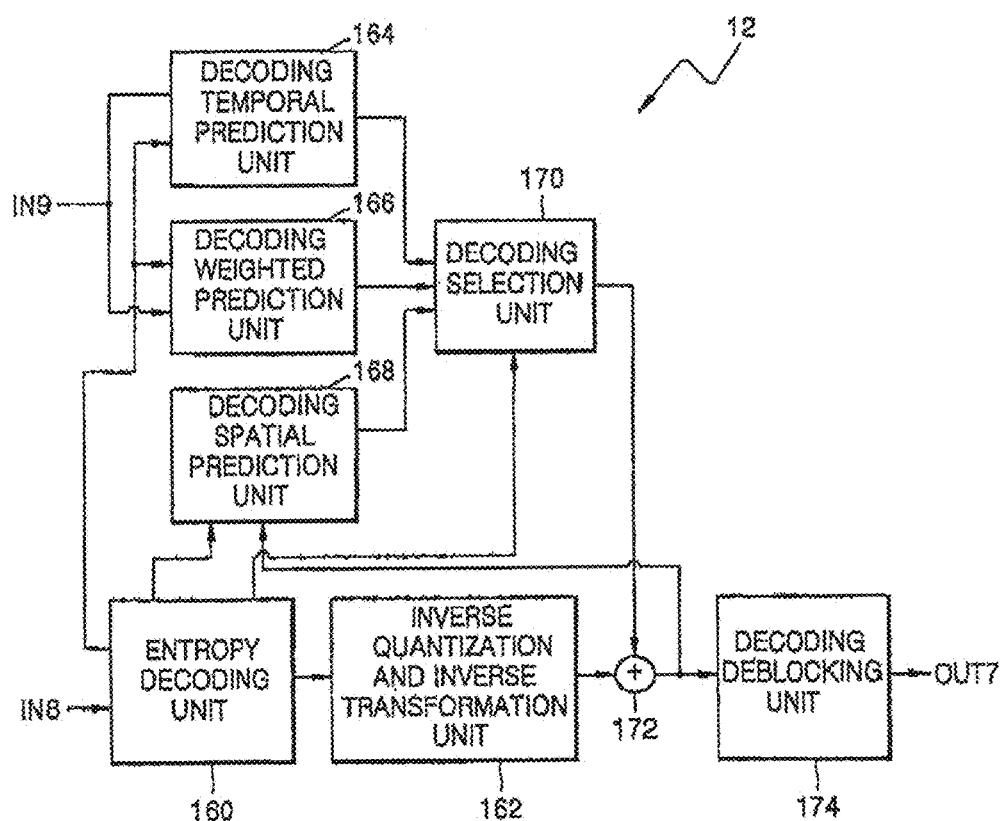
FIG. 10 is a block diagram of an embodiment of a decoding unit shown in FIG. 1 according to an embodiment of the present invention.

FIG. 10 is a block diagram of an embodiment 12 of the decoding unit 12 of FIG. 1 according to the present invention. The decoding unit 12 includes an entropy decoding unit 160, an inverse quantization and inverse transformation unit 162, a decoding temporal prediction portion unit 164, a decoding weighted prediction unit 166, a decoding spatial prediction unit 168, a decoding selection unit 170, a decoding addition unit 172, and a decoding deblocking unit 174.

Figure 11:
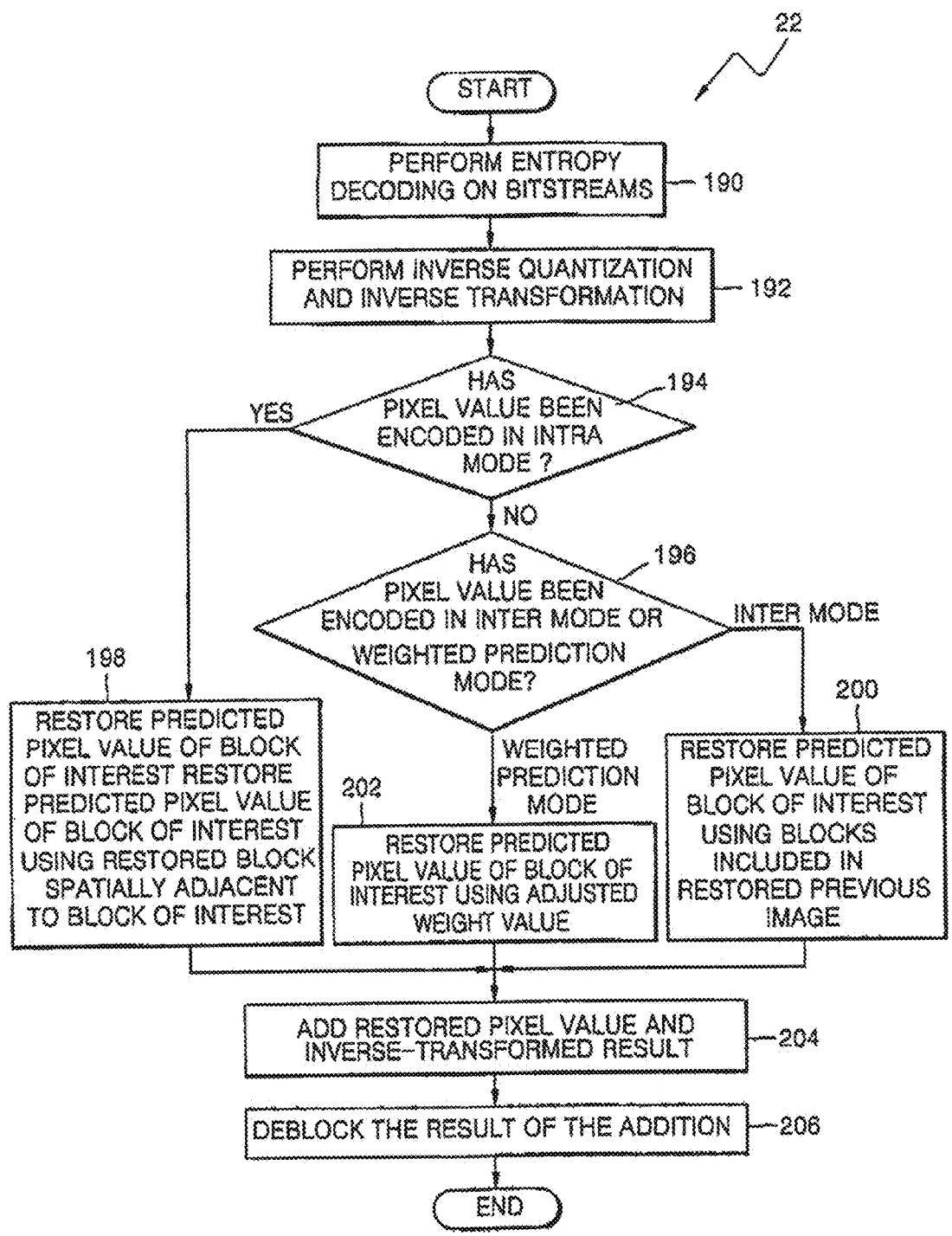
FIG. 11 is a flowchart illustrating operation 22 of FIG. 3 according to an embodiment of the present invention.

FIG. 11 is a flowchart illustrating operation 22 illustrated in FIG. 3 according to the present invention. Operation 22 includes performing entropy decoding and inverse quantization and inverse transformation (operations 190 and 192), restoring a pixel value according to each mode (operations 194 through 202), and decoding the encoded value (operations 204 and 206).

The entropy encoding unit 160 of FIG. 10 performs entropy decoding on the bitstreams input via an input port IN8 from the encoding unit 10 and outputs the entropy-decoded result to the inverse quantization and inverse transformation unit 162 (operation 190). Here, various kinds of additional information included in the bitstreams are also decoded.

After operation 190, the inverse quantization and inverse transformation unit 162 performs inverse-quantization on the entropy-decoded result input from the entropy decoding unit 160, performs inverse transformation on the inverse-quantized result, and outputs the inverse-transformed result to the decoding addition unit 172 (operation 192). Here, the inverse-transformed result output from the inverse quantization and inverse transformation unit 162 is the result of restoring the prediction-encoded value.

After operation 192, the decoding selection unit 170 determines whether the mode in which the pixel value of the block of interest in the encoding unit 10 is an intra mode (operation 194). If the mode in which the pixel value of the block of interest in the encoding unit 10 is determined not to be the intra mode, the decoding selection unit 170 determines whether the mode in which the pixel value of the block of interest in the encoding unit 10 is an inter mode or a weighted prediction mode (operation 196). To this end, the decoding selection unit 170 may use additional information, which is the result of the determination performed in the encoding weight value selection portion 124, encoded in the entropy encoding unit 52 and decoded in the entropy decoding unit 160. For example, the decoding selection unit 170 selects as the restored predicted pixel value one of the predicted pixel values restored in the decoding weighted prediction unit 166, the decoding spatial prediction unit 168, and the decoding temporal prediction unit 164 in response to the additional information input from the entropy decoding unit 160 and outputs the selected result to the decoding addition unit 172.

If the encoding mode is determined to be the intra mode, the decoding selection unit 170 selects the output from the encoding spatial prediction unit 168. The decoding spatial prediction unit 168 receives restored blocks included in the restored current image from the decoding addition unit 172, restores the pixel value, predicted by the encoding unit 10, of the block of interest using blocks spatially adjacent to the block of interest among the blocks received from the decoding addition unit 172, and outputs the restored result to the decoding selection unit 170 (operation 198). To this end, the decoding spatial prediction unit 168 may restore the pixel value of the block of interest using additional information corresponding to the direction of prediction among various kinds of additional information restored in the entropy decoding unit 160.

If the encoding mode is determined to be the inter mode, the decoding selection unit 170 selects the output from the decoding temporal prediction unit 164. The decoding temporal prediction unit 164 restores the predicted pixel value of the block of interest using the block of interest and blocks included in the restored previous image input via an input port IN9 and outputs the restored result to the decoding selection unit 170 (operation 200). The blocks included in the restored previous image input to the decoding weighted prediction unit 166 and the decoding temporal prediction unit 164 via the input port IN9 in FIG. 10 belong to the previous image decoded in the decoding deblocking unit 174.

To perform the above-described operations, the decoding temporal prediction unit 164 may receive additional information such as estimated motion among various kinds of additional information decoded in the entropy-decoding unit 160 and restore the predicted pixel value of the block of interest using the received additional information. The decoding temporal prediction unit 164 can find at least one block having a pixel value similar to the pixel value of the block of interest among the blocks included in the restored previous image based on the additional information corresponding to the estimated motion and can restore the predicted pixel value of the block of interest using the found block.

If the encoding mode is determined to be the weighted prediction mode, the decoding selection unit 170 selects the output from the decoding weighted prediction unit 166. The decoding weighted prediction unit 166 adjusts at least one weight value adaptively to the number of bits, restores the predicted pixel value of the block of interest using the adjusted weight value, and outputs the restored result to the decoding selection unit 170 (operation 202).

According to the present invention, the decoding weighted prediction unit 166 in FIG. 10 may adjust the weight value in proportion to the number of bits.

Figure 12:
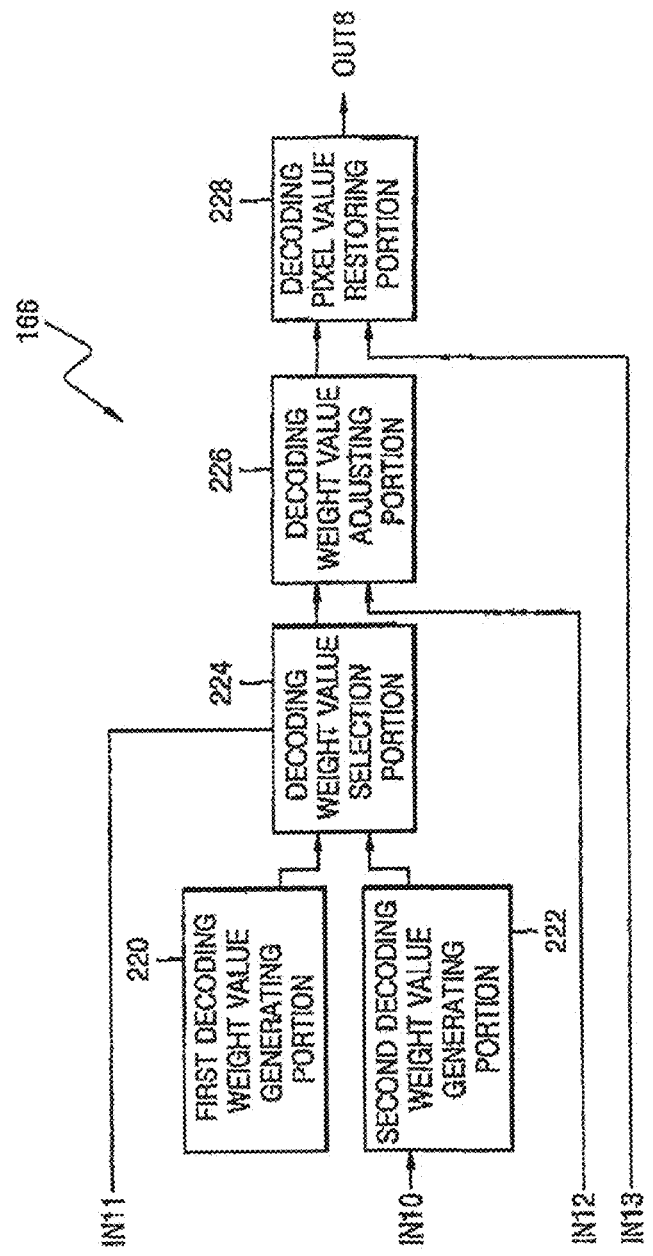
FIG. 12 is a block diagram of an embodiment of a decoding weighted prediction unit in FIG. 10 according to the present invention.

FIG. 12 is a block diagram of an embodiment of the decoding weighted prediction unit 166 in FIG. 10 according to the present invention. The decoding weighted prediction unit 166 includes first and second decoding weight value generating portions 220 and 222, a decoding weight value selection portion 224, a decoding weight value adjusting portion 226, and a decoding pixel value restoring portion 228.

Figure 13:
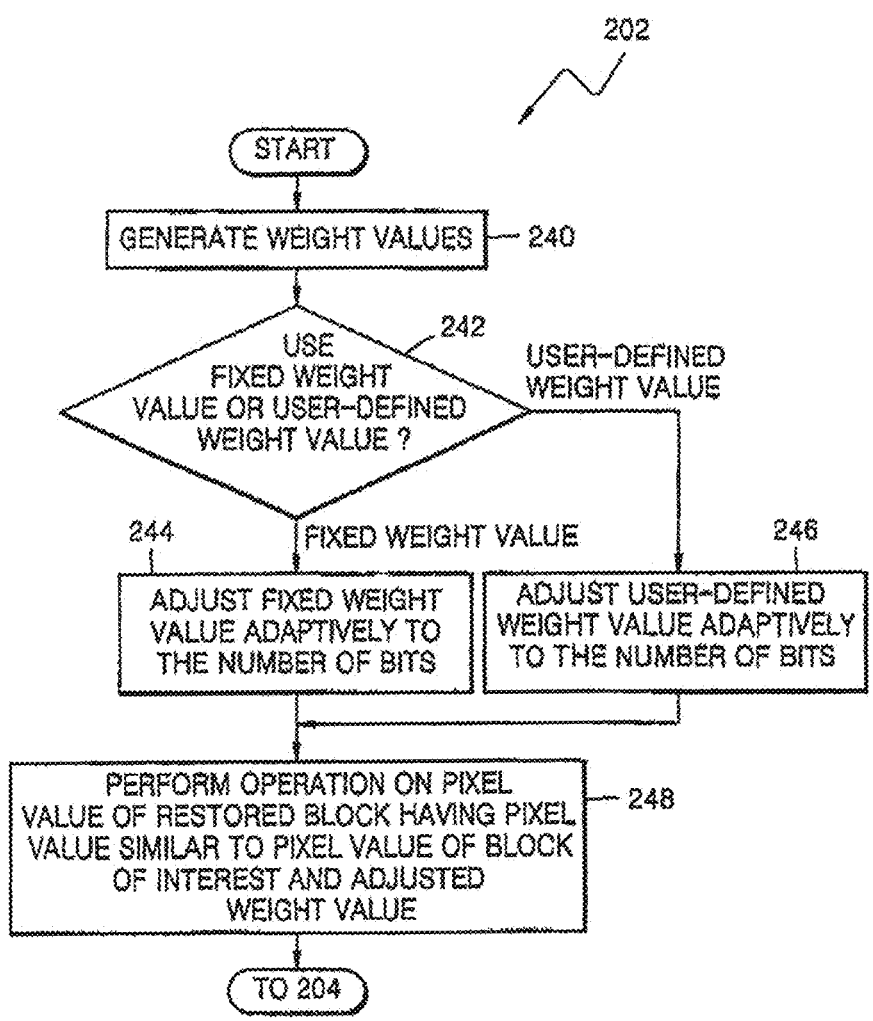
FIG. 13 is a flowchart illustrating operation 202 in FIG. 11 according to an embodiment of the present invention.

FIG. 13 is a flowchart illustrating operation 202 in FIG. 11 according to the present invention. Operation 202 includes generating and adjusting weight values (operations 240 through 246) and performing an operation on the adjusted weight value and the pixel value of at least one block having pixel value that is similar to the pixel value of the block of interest (operation 248).

The first and second decoding weight value generating portions 220 and 222 generate the weight values (operation 240). For example, the first decoding weight value generating portion 220 generates a fixed weight value that is the same as the weight value generated in the first encoding weight value generating portion 120 and outputs the generated fixed weight value to the encoding weight value selection portion 124. Here, the weight value to be generated by the first encoding weight generating unit 120 and the first decoding weight value generating portion 220 is predetermined.

When among blocks included in the restored previous image a plurality of blocks having pixel values similar to the pixel value of the block of interest are included in the same restored previous image, the first decoding weight value generating portion 220 can generate the weight values according to equation (5). However, among blocks included in the restored previous image a plurality of blocks having pixel values similar to the pixel values of the block of the interest are distributed in different restored previous images, the first decoding weight value generating portion 220 generates the weight values according to the time difference between the time when each of the similar previous images is displayed and the time when the current image is displayed.

The second decoding weight value generating portion 222 receives via an input port IN10 from the entropy decoding unit 160 additional information corresponding to the weight value generated in the second encoding weight value generating portion 122 among various kinds of additional information decoded in the entropy decoding unit 160, generates the weight value using the received additional information, and outputs the generated weight value to the decoding weight value selection portion 224. That is, the second decoding weight value generating portion 222 restores the weight value generated in the second encoding weight value generating portion 122 using the additional information. The second decoding weight value generating portion 222 may generate weight values to be operated on pixel values of blocks having pixel values similar to the pixel value of the block of interest among the blocks included in the restored previous image, differently according to the blocks having similar pixel values.

After operation 240, the decoding weight value selection portion 224 selects one of the weight values generated in the first and second decoding weight value generating portions 220 and 222 and outputs the selected weight value to the decoding weight value adjusting portion 226. To this end, the decoding weight value selection portion 224 may receive additional information, which is the result of the determination in the encoding weight value selection portion 124, from the entropy decoding unit 160 via an input port IN11 and select one of the weight values generated in the first and second decoding weight value generating portions 220 and 222 using the received additional information. For example, if the weight value selected in the encoding weight value selection portion 124 is determined to be the user-defined weight value based on the additional information, the decoding weight value selection portion 224 selects the weight value generated in the second decoding weight value generating portion 222. However, if the weight value selected in the encoding weight value selection portion 124 is determined to be the fixed weight value based on the additional information, the decoding weight value selection portion 224 selects the weight value generated in the first decoding weight value generating portion 220. In other words, the decoding weight value selection portion 224 determines whether to use the fixed weight value or the user-defined weight value in response to the additional information, selects the fixed weight value or the user-defined weight value according to the result of the determination, and outputs the selected weight value to the decoding weight value adjusting portion 226 (operation 242).

The decoding weight value adjusting portion 226 adjusts at least one fixed weight value or at least one user-defined weight value adaptively to the number of bits input via an input port IN12, and outputs the adjusted weight value to the decoding pixel value restoring portion 228 (operations 244 and 246). The decoding weight value adjusting portion 226 may adjust the weight value adaptively to the number of bits using equation (1), (3), or (4) above.

After operation 244 or 246, the decoding pixel value restoring portion 228 performs an operation on the pixel value of at least one block having a pixel value similar to the pixel value of the block of interest among the blocks included in the restored previous image input via the input port IN13 and the at least one adjusted weight value input from the decoding weight value adjusting portion 226, and outputs the result of the operation, which is the result of restoring the predicted pixel value of the block of interest, to the decoding selection unit 170 via an output port OUT8 (operation 248). To this end, the decoding pixel value restoring portion 228 receives from the entropy decoding unit 160 additional information such as estimated motion among various kinds of additional information decoded in the entropy decoding unit 160 via an input port IN13, and restores the predicted pixel value of the block of interest using the received additional information corresponding to the estimated motion. The decoding pixel value restoring portion 228 can find at least one block having a pixel value similar to the pixel value of the block of interest among the blocks included in the restored previous image based on the additional information corresponding to the estimated motion and restore the predicted pixel value of the block of interest using the found block.

When the encoding pixel value prediction portion 128 predicts the pixel value of the block of interest according to equation (2) above, the decoding pixel value restoring portion 228 may restore the predicted pixel value of the block of interest by multiplying the pixel value of at least one block having pixel value similar to the pixel value of the block of interest among the blocks included in the restored preceding image by at least one adjusted weight value and adding other adjusted weight values to the product.

After operation 198, 200, or 202, the decoding addition unit 172 adds the restored predicted pixel value of the block of interest input from the decoding selection unit 170 and the inverse-transformed result received from the inverse quantization and inverse transformation unit 162, and outputs the result of the addition to both the decoding spatial prediction unit 168 and the decoding deblocking unit 174 (operation 204).

After operation 204, the decoding deblocking unit 174 deblocks the result of the addition performed in the decoding addition unit 172 and outputs the deblocked result as the result of decoding the pixel value of the block of interest via an output port OUT7 (operation 206).

In another embodiment according to the present invention, the encoding unit 10 of FIG. 5 may not include the encoding spatial prediction unit 42, the encoding temporal prediction unit 44, and the encoding selection unit 46. The decoding unit 12 of FIG. 10 may not include the decoding spatial prediction unit 168, the decoding temporal prediction unit 164, and the decoding selection unit 170. In this case, the pixel value of the block of interest predicted in the encoding weighted prediction unit 40 is directly output to the subtraction unit 48 and the encoding addition unit 56, and the pixel value of the block of interest restored in the decoding weight prediction unit 166 is directly output to the decoding addition unit 172.

In another embodiment according to the present invention, the encoding unit 10 of FIG. 5 may include one of the encoding spatial prediction unit 42 and the encoding temporal prediction unit 44, and the decoding unit 12 of FIG. 10 may include one of the decoding spatial prediction unit 168 and the decoding temporal prediction unit 164.

According to the present invention, when the structure in which the subtraction unit 48, the transformation and quantization unit 50, the entropy encoding unit 52, the inverse quantization and inverse transformation unit 54, the encoding addition unit 56, and the encoding deblocking unit 58 are included in the encoding unit 10 of FIG. 5 is one embodiment which can encode the pixel value of the block of interest using the predicted pixel value output from the encoding selection unit 46. Also, the structure in which the entropy decoding unit 160, the inverse quantization and inverse transformation unit 162, the decoding addition unit 172, and the decoding deblocking unit 174 are included in the decoding unit 12 of FIG. 10 is one embodiment which can decode the pixel value of the block of interest. Therefore, the preset invention is not limited to the structures shown in FIGS. 5 and 10.

An image encoding and decoding apparatus and method according to the present invention has been described in the above embodiments in connection with the technology of standardization of ISO/IEC MPEG and H.264/MPEG-4 Part 10 AVC suggested by the Joint Video Team (JVT) of ITU-T VCEG. Each of the encoding deblocking unit 58 and the decoding deblocking unit 174 in the image encoding and decoding apparatus according to the present invention corresponds to a declocking filter (not shown) disclosed in the standardization technology. However, the present invention is not limited to this standardization technology. In particular, the encoding spatial prediction unit 42, the encoding temporal prediction unit 44, which are shown in FIG. 5, and the decoding temporal prediction unit 164 and the decoding spatial prediction unit 168, which are shown in FIG. 10, may use a different time and spatial predicting method.

As described above, in an image encoding and decoding apparatus and method according to the present invention, an image can be encoded and decoded using a weight value adjusted adaptively to change in the number of bits expressing each pixel of the image. In other words, weighted prediction is performed using weight values that are adjusted by performing an operation on weight values, W, $W_1$, $W_2$, $O_1$, and $O_2$, which are used in a conventional weighted prediction encoding and decoding apparatus, and a constant value (1 or $2^{N-M}$). Therefore, encoding and decoding can be efficiently performed even using the codec of the conventional apparatus.

The present invention can be applied as a method, an apparatus and a system. When the present invention is executed using software, elements of the present invention are code segments for necessary operations. Programs or code segments may be stored in a processor readable recording medium or may be transmitted over computer data signals that are coupled with carrier waves in transmission medium or communication network. The processor readable recording medium is any data storage device that can store or transmit information which can be thereafter read by a computer system. Examples of the processor readable recording medium includes electronic circuit, semiconductor memory, read-only memory (ROM), flash memory, erasable ROM (EROM), floppy disks, optical disks, hard disks, optical fiber medium, and RF network. The computer data signals include signals that can be propagated over a transmission medium, such as electronic network channel, optical fiber, air, electromagnetic field, and RF network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image decoding method comprising:
    obtaining variables for weighted prediction, including at least one multiplied value (W) and at least one additive value (O), wherein the additive value is obtained according to a bit depth of a pixel, when the weighted prediction is applied to a block; and
    obtaining a predicted pixel value of the block using the weighted prediction based on the variables,
    wherein the additive value is obtained based on a value of $2^{(N-M)}$, where N represents the bit depth of the pixel and M represents a constant, and the additive value being added to a result of a multiplication operation using the at least one multiplied value.

* * * * *